United States Patent
Yoshida

(10) Patent No.: US 7,239,419 B2
(45) Date of Patent: Jul. 3, 2007

(54) FACSIMILE APPARATUS AND COLOR INFORMATION COMMUNICATION METHOD USING SAME

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1073 days.

(21) Appl. No.: 10/376,087

(22) Filed: Feb. 28, 2003

(65) Prior Publication Data

US 2003/0179417 A1    Sep. 25, 2003

(30) Foreign Application Priority Data

Mar. 1, 2002   (JP)   ............................. 2002-056424
Feb. 17, 2003  (JP)   ............................. 2003-038613

(51) Int. Cl.
  *G06K 15/02* (2006.01)
  *G06K 1/00* (2006.01)
  *H04N 1/00* (2006.01)

(52) U.S. Cl. .................... 358/1.2; 358/1.9; 358/402

(58) Field of Classification Search ................. 358/1.2, 358/1.9, 402
See application file for complete search history.

(56) References Cited

U.S. PATENT DOCUMENTS 7,024,500 B2 * 4/2006 Ashizaki et al. .............. 710/65
7,034,844 B2 * 4/2006 Akiyama et al. ............ 345/590
2004/0169875 A1 * 9/2004 Yoshida et al. .............. 358/1.9
2006/0215203 A1 * 9/2006 Taniuchi et al. ........... 358/1.13

OTHER PUBLICATIONS

U.S. Appl. No. 10/347,377, filed Jan. 21, 2003, Yoshida.

* cited by examiner

*Primary Examiner*—Jerome Grant
*Assistant Examiner*—Houshang Safaipour
(74) *Attorney, Agent, or Firm*—Morgan & Finnegan LLP

(57) ABSTRACT

Disclosed are a monochrome facsimile apparatus capable of supporting communication of color information in sYCC color space, and a color-information communication method that uses this facsimile apparatus. If a compact flash card has been inserted into the monochrome facsimile apparatus, which is capable of communicating color file information, the facsimile apparatus notifies the transmitting side, by prescribed bits of the FIF of a DIS signal, that it has a function for receiving JPEG-coded information, lacks a function for receiving full-color information in Lab color space, and has a function for receiving full-color information in sYCC color space. If the facsimile apparatus senses, by prescribed bits of the FIF of a DCS signal, that a designation to transmit full-color information in sYCC color space has been received from the transmitting side, then the facsimile apparatus is allowed to receive color information, which is then stored on the compact flash card without being printed, by information receiving means having the function for receiving JPEG-coded information and the function for receiving full-color information in sYCC color space.

25 Claims, 9 Drawing Sheets

| FIF | DIS/DTC SIGNAL | DCS SIGNAL |
|---|---|---|
| BIT 68 | WHETHER OR NOT JPEG RECEIVING FUNCTION IS SUPPORTED | JPEG TRANSMIT DESIGNATION |
| BIT 69 | WHETHER OR NOT FUNCTION FOR RECEIVING FULL COLOR IN Lab COLOR SPACE IS SUPPORTED | DESIGNATION TO TRANSMIT FULL COLOR IN Lab COLOR SPACE |
| BIT X | WHETHER OR NOT FUNCTION FOR RECEIVING FULL COLOR IN sYCC COLOR SPACE IS SUPPORTED | DESIGNATION TO TRANSMIT FULL COLOR IN sYCC COLOR SPACE |

FIG. 2

| FIF | DIS/DTC SIGNAL | DCS SIGNAL |
|---|---|---|
| BIT 68 | WHETHER OR NOT JPEG RECEIVING FUNCTION IS SUPPORTED | JPEG TRANSMIT DESIGNATION |
| BIT 69 | WHETHER OR NOT FUNCTION FOR RECEIVING FULL COLOR IN Lab COLOR SPACE IS SUPPORTED | DESIGNATION TO TRANSMIT FULL COLOR IN Lab COLOR SPACE |
| BIT X | WHETHER OR NOT FUNCTION FOR RECEIVING FULL COLOR IN sYCC COLOR SPACE IS SUPPORTED | DESIGNATION TO TRANSMIT FULL COLOR IN sYCC COLOR SPACE |

FIG. 6

| FIF | DIS/DTC SIGNAL | DCS SIGNAL |
|---|---|---|
| BIT 68 | WHETHER OR NOT JPEG RECEIVING FUNCTION IS SUPPORTED | JPEG TRANSMIT DESIGNATION |
| BIT 69 | WHETHER OR NOT FUNCTION FOR RECEIVING FULL COLOR IN Lab COLOR SPACE IS SUPPORTED | DESIGNATION TO TRANSMIT FULL COLOR IN Lab COLOR SPACE |
| BIT Y | WHETHER OR NOT FUNCTION FOR JPEG RECEPTION IN sYCC COLOR SPACE IS SUPPORTED | DESIGNATION TO TRANSMIT FULL COLOR IN sYCC COLOR SPACE |

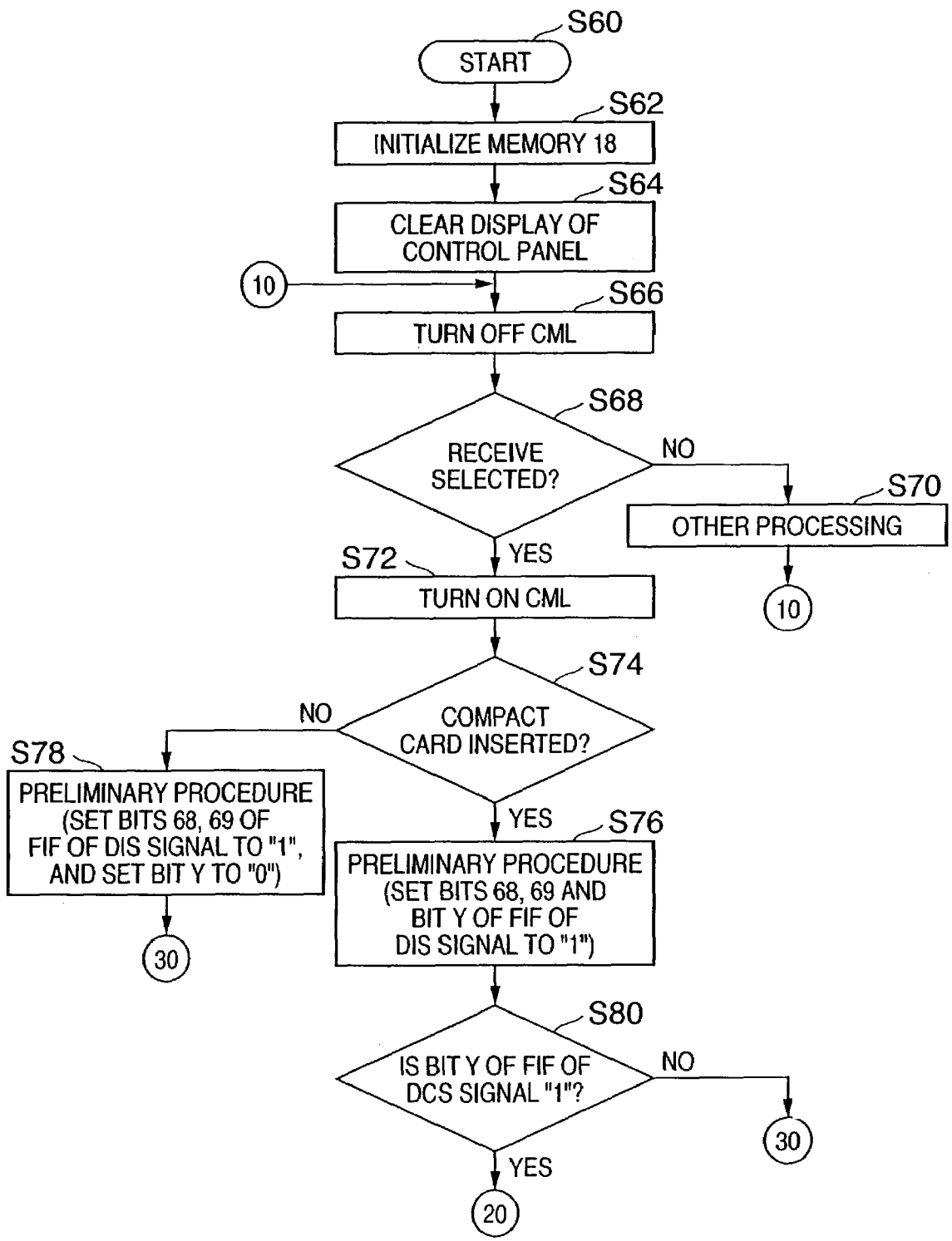

FACSIMILE APPARATUS AND COLOR INFORMATION COMMUNICATION METHOD USING SAME

FIELD OF THE INVENTION

This invention relates to a facsimile apparatus and, more particularly, to a facsimile apparatus capable of receiving color file information, and to a color information communication method using this facsimile apparatus.

BACKGROUND OF THE INVENTION

Facsimile machines used heretofore have mainly been for monochrome communication. In recent years, however, the growing popularity of ink-jet printers, digital cameras and personal computers has been accompanied by a sharp increase in the handling of color information. These changing circumstances have given rise to the need for communication of color information.

First, communication of color information at the present time in accordance with the recommendations of the ITU-T will be described.

Transmission of full-color information is executed in Lab color space of ITU-T Recommendation T.82 by JPEG coding stipulated by ITU-T Recommendation T.82. Both a transmitter and a receiver execute facsimile communication of color information by a stand-alone facsimile apparatus.

In the example of the prior art described above, the color space of transmitted color facsimile information is Lab color space, but the color space of color information captured by, e.g., a digital camera is sYCC. Further, color space in a case where color information is displayed by a personal computer also is sYCC. That is, the need for color information communication in sYCC color space is growing in view of the recent popularization of digital cameras and personal computers.

In a facsimile apparatus, however, higher price results when it is attempted to cover both color reading and color printing. Accordingly, users are looking forward to the appearance of a monochrome facsimile apparatus that is capable of supporting communication of color information in sYCC color space.

SUMMARY OF THE INVENTION

Accordingly, an object of the present invention is to respond to user demand by providing a facsimile apparatus that is capable of supporting communication of color information in sYCC color space, and a color-information communication method that uses this facsimile apparatus.

According to the present invention, the foregoing object is attained by providing a facsimile apparatus capable of communicating file information, the facsimile apparatus capable of receiving JPEG-coded information and color information in sYCC color space, comprising: function notification means for notifying a transmitting side of a receiving function of this facsimile apparatus; storage medium setting unit for setting a storage medium for storing information; information storing means for storing JPEG-coded information in sYCC color space, which is received from a transmitting side, into the storage medium; and status detection means for detecting whether the storage medium is installed or removed; wherein when the status detection means is detected removal of the storage medium, the function notification means notifies the transmitting side that this facsimile apparatus does not have a function for receiving JPEG-coded color information in sYCC color space, while when the storage medium is installed, the function notification means notifies the transmitting side that this facsimile apparatus has a function for receiving JPEG-coded color information in sYCC color space. In the facsimile apparatus, JPEG-coded color information in sYCC color space received from the transmitting side is not printed by a printing unit, but stored into the storage medium. The facsimile apparatus is capable of receiving JPEG-coded color information in Lab color space, and JPEG-coded color information in Lab color space received from the transmitting side is printed by the printing unit.

Further, according to the present invention, the foregoing object is attained by providing a facsimile apparatus capable of communicating file information, the facsimile apparatus capable of receiving JPEG-coded information and color information in sYCC color space, comprising: storage medium setting unit for setting a storage medium for storing information; function notification means for notifying a transmitting side that this facsimile apparatus has a function for receiving JPEG-coded information, lacks a function for receiving color information in Lab color space, and has a function for receiving color information in sYCC color space; receive control means for controlling to receive color information when a designation to transmit color information in sYCC color space is received from the transmitting side, color information storing means for storing JPEG-coded color information in sYCC color space, which is received from the transmitting side, into the storage medium. The facsimile apparatus further comprises status detection means for detecting whether the storage medium is installed or removed; wherein when the storage medium is not installed, the function notification means notifies the transmitting side that this facsimile apparatus does not have the function for receiving JPEG-coded information, the function for receiving color information in Lab color space, or the function for receiving color information in sYCC color space.

In a preferred embodiment, function notification is performed by prescribed bits of a FIF (Facsimile Information Field) of a DIS and/or DTC signal, and the designation to transmit is implemented by prescribed bits of a FIF of a DCS signal.

By virtue of the invention constructed as set forth above, a facsimile apparatus supports only sYCC color space, received information in sYCC color space is uploaded to a card (e.g., a compact flash card), and the received information that has been stored on the card can be displayed on a personal computer or viewed by a digital camera. If the compact flash card has not been inserted, uploading of color file information in sYCC color space to the card is impossible even if this information is received. This makes it possible to forego receiving color file information and, hence, eliminates reception of color file information that is essentially useless. The facsimile apparatus is a monochrome apparatus, it is possible to communicate color file information in sYCC color space by an inexpensive apparatus, and this information can be uploaded to a card. Such an apparatus is very easy for a user to operate.

Further, the facsimile apparatus is a color apparatus, and color file information in sYCC color space can be uploaded to a card and color file information in Lab color space can be printed by a printing unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram useful in describing a first specific example of protocol signals according to this embodiment;

FIG. 6 is a diagram useful in describing a second specific example of protocol signals according to this embodiment; and FIGS. 7 to 9 are flowcharts illustrating an example of a second control procedure of a called station in call transmission in the facsimile apparatus according to this embodiment.

DETAILED DESCRIPTION OF THE PREFERRED EMBODIMENTS

A preferred embodiment of the present invention will now be described in detail with reference to the accompanying drawings.

<Example of Structure of Facsimile Apparatus According to the First Embodiment>

Figure 1:
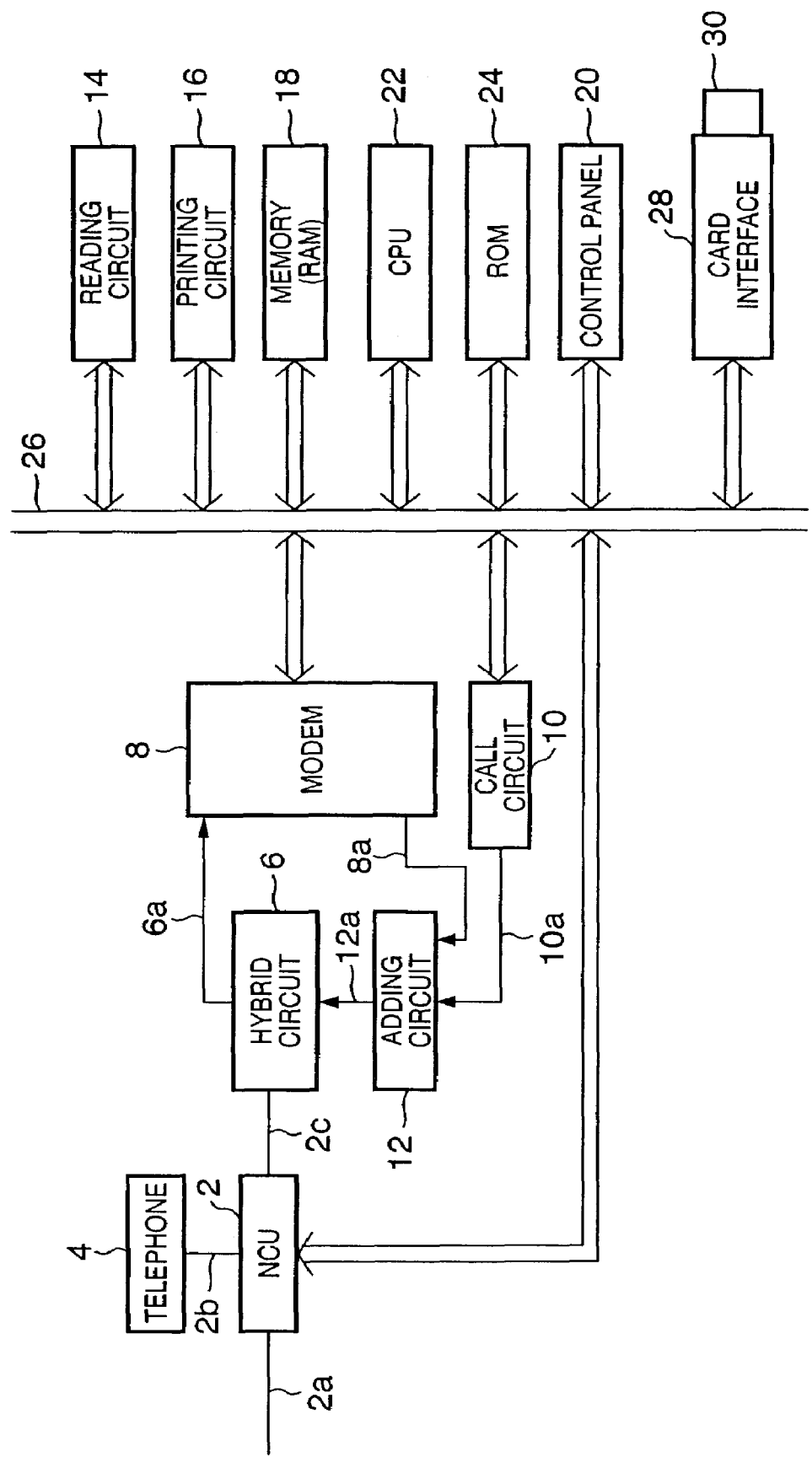
FIG. 1 is a block diagram of a facsimile apparatus according to an embodiment of the present invention.

FIG. 1 is a block diagram illustrating an example of a facsimile apparatus according to the first embodiment of the present invention.

The apparatus includes an NCU (network control unit) 2 which, in order to use a telephone network for data communication, is connected to a terminal on the line and maintains a loop by controlling connection to a telephone switching network and changing over to a data communication path. Further, the NCU 2, under control from a bus 26, connects a telephone line 2a to the telephone side (CML OFF) and connects the telephone line 2a to the side of the facsimile apparatus (CML ON). Under ordinary conditions, the telephone line 2a is connected to the side of a telephone 4.

A hybrid circuit 6 separates the signal from the NCU 2 into transmit-channel signal and a receive-channel signal, sends a transmit signal from an adding circuit 12 to the telephone line 2a via the NCU 2, receives a signal from another party via the NCU 2 and sends this signal to a modem 8 via a signal line 6a. The modem 8 performs modulation and demodulation based upon ITU-T Recommendations V.8, V.21, V.27ter, V.29, V.17 and V.34, etc. The sending mode of the modem is specified by control over the bus 26. A transmit signal from the bus 26 is input to the modem 8, which outputs demodulated data on a signal line 8a. A receive signal being output on the signal line 6a is input to the modem 8, which outputs demodulated data to the bus 26.

Telephone-number information is input to a call circuit 10 by a signal from the bus 26, and the call circuit 10 outputs a DTMF selection signal to a signal line 10a. Information on the signal line 8a and information on the signal line 10a is input to the adding circuit 12. The latter adds this information and inputs the result to a signal line 12a.

A reading circuit 14 is capable of reading only monochrome data (the circuit is a comparatively inexpensive one that cannot read color data). The read data is output to the bus 26. A printing circuit 16 is capable of printing only monochrome data (the circuit is a comparatively inexpensive one that cannot print color data). Information that is being output to the bus 26 is printed by printing circuit 16 sequentially line by line.

A memory circuit 18 is a work memory (RAM) and is further used to store the raw information or coded information of read data and to store received information or decoded information, etc., via bus 26.

A control panel 20 has single-touch keys, abbreviated dialing keys, a numeric keypad, an asterisk (*) key, a star key, a stop key, a set key, a key for selecting transmission of file information and other function keys. Information from the pressed key is output to the bus 26. The control panel 20 has a display unit to which information being output to the bus 26 is input for being displayed.

A CPU (central processing unit) 22 exercises overall control of the facsimile apparatus and executes a facsimile transmission control procedure. The program executed by the CPU 22 has been stored in a ROM 24. A card interface 28 is connected to the bus 26. A compact flash card 30 is connected to the bus 26 via the card interface 28. The card interface 28 and compact flash card 30 are removable and indicate a medium by which a received color image can be moved to a personal computer or card reader, etc., manually. It should be obvious that other examples of this medium are a floppy disk, a CD, a DVD or a magneto-optic disk.

<Examples of Operation of Facsimile Apparatus According to the First Embodiment>

FIG. 2 illustrates an example of a protocol added to ITU-T Recommendation T.30 by the present invention.

Whether or not the apparatus has a JPEG receiving function is reported by the ON or OFF status of bit 68 of the FIF (Facsimile Information Field) of a DIS signal and/or DTC signal, which is sent from the receiving side to the transmitting side, and JPEG transmission is specified by the ON or OFF status of bit 68 of the FIF of a DCS signal from the transmitting side to the receiving side. Further, whether or not the apparatus has a function for receiving full color in Lab color space is reported by the ON or OFF status of bit 69 of the FIF of the DIS/DTC signal, and full-color transmission in Lab color space is specified by the ON or OFF status of bit 69 of the FIF of the DCS signal. Further, whether or not the apparatus has a function for receiving full color in sYCC color space is reported by the ON or OFF status of bit X of the FIF of the DIS/DTC signal, and full-color transmission in sYCC color space is specified by the ON or OFF status of bit X of the FIF of the DCS signal. That is, the bit 68 of the FIF of the DIS signal/DTC signal/DCS signal is used in giving notification of the JPEG communication function, bit 69 of the FIF of the DIS signal/DTC signal/DCS signal is used in giving notification of the full-color communication function for Lab color space, and bit X of the FIF of the DIS signal/DTC signal/ DCS signal is used in giving notification of the full-color communication function for sYCC color space.

In other words, this can be rephrased from a different point of view by stating that bits 68, 69 and bit X of the FIF of the DIS signal and/or of the DTC signal from the receiving side to the transmitting side are used as notification of a receiving function relating to color communication by the facsimile apparatus, and that bits 68, 69 and bit X of the FIF of the DCS signal from the transmitting side to the receiving side are used as a designation to perform transmission relating to color communication by the facsimile apparatus.

Thus, a monochrome facsimile apparatus capable of communicating color file information according to this embodiment includes the following when it operates as a receiver: means for reporting whether the apparatus has a function for receiving JPEG-coded information; means for reporting whether the apparatus has a function for receiving full-color information in Lab color space; and means for reporting whether the apparatus has a function for receiving full-color information in sYCC color space. On the other hand, in a case where the apparatus operates as a transmitter, the apparatus includes: means for designating transmission of JPEG-coded information; means for designating transmission of full-color information in Lab color space; and means for designating transmission of full-color information in sYCC color space. If receipt of color information is possible in a case where the apparatus operates as a receiver, the apparatus reports that it has the function for receiving JPEG-coded information, lacks the function for receiving full-color information in Lab color space and has the function for receiving full-color information in sYCC color space. If the facsimile apparatus capable of communicating color file information according to this embodiment is provided at least with the above-described means as a receiver, the apparatus can operate as a monochrome facsimile apparatus that is capable of communicating color file information.

The apparatus further includes means equipped with a memory card such as a compact flash card. If the compact flash card is inserted and JPEG communication in sYCC color space is designated, the received information is uploaded to the card. If communication of monochrome information is designated, the received information is printed. Hence, if JPEG communication in sYCC color space is designated, the received information is not printed. On the other hand, if the compact flash card has not been inserted, it is construed that the JPEG receiving function and sYCC color-space receiving function are absent. If JPEG communication in Lab color space is designated from the side of the transmitter, reception is suspended on the side of the receiver.

A control program for the first example of operation described above is stored in the ROM 24 of the facsimile apparatus. The program is executed by CPU 22.

Figure 3:
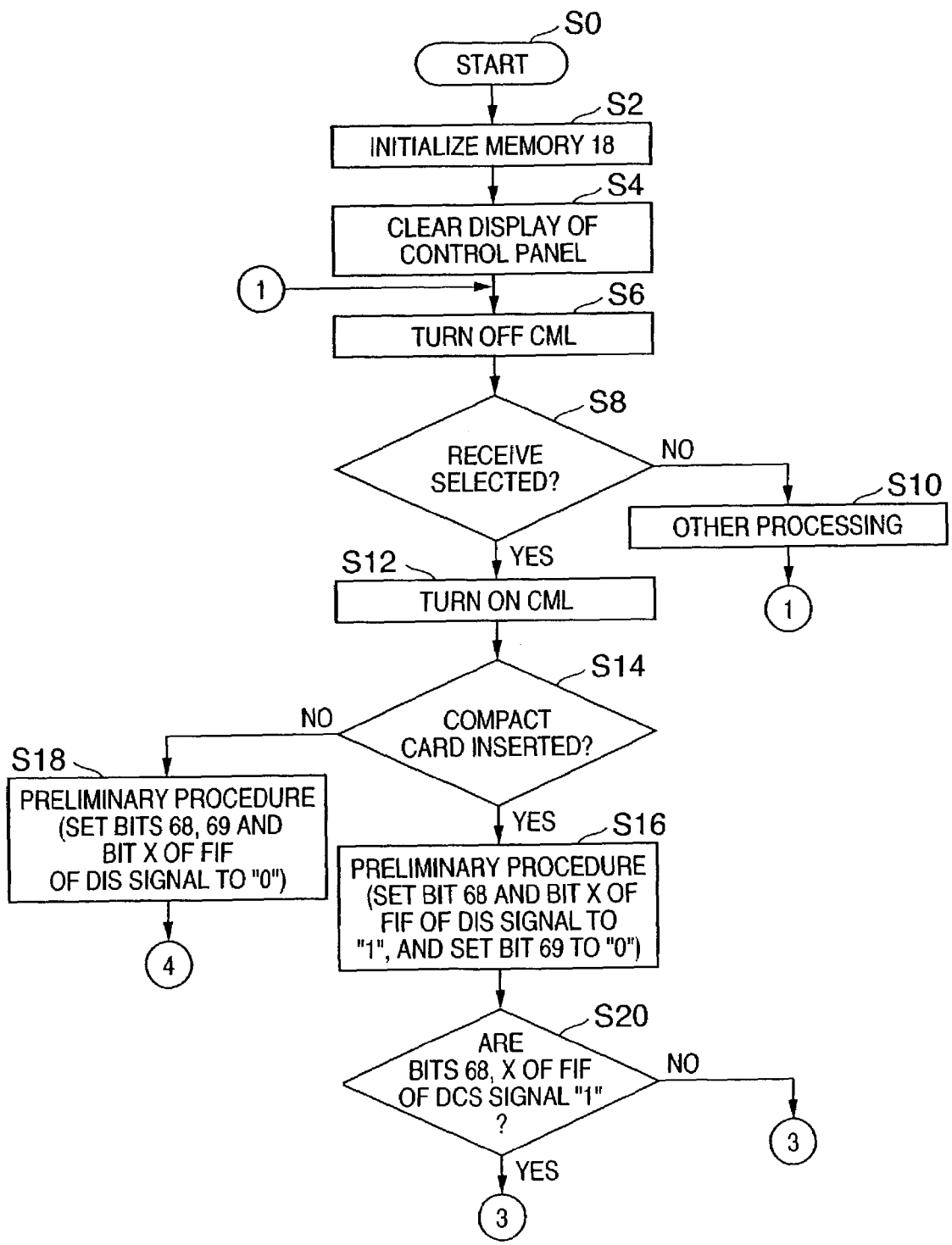
FIGS. 3 to 5 are flowcharts illustrating an example of a first control procedure of a called station in call transmission in the facsimile apparatus according to this embodiment.
Figure 4:
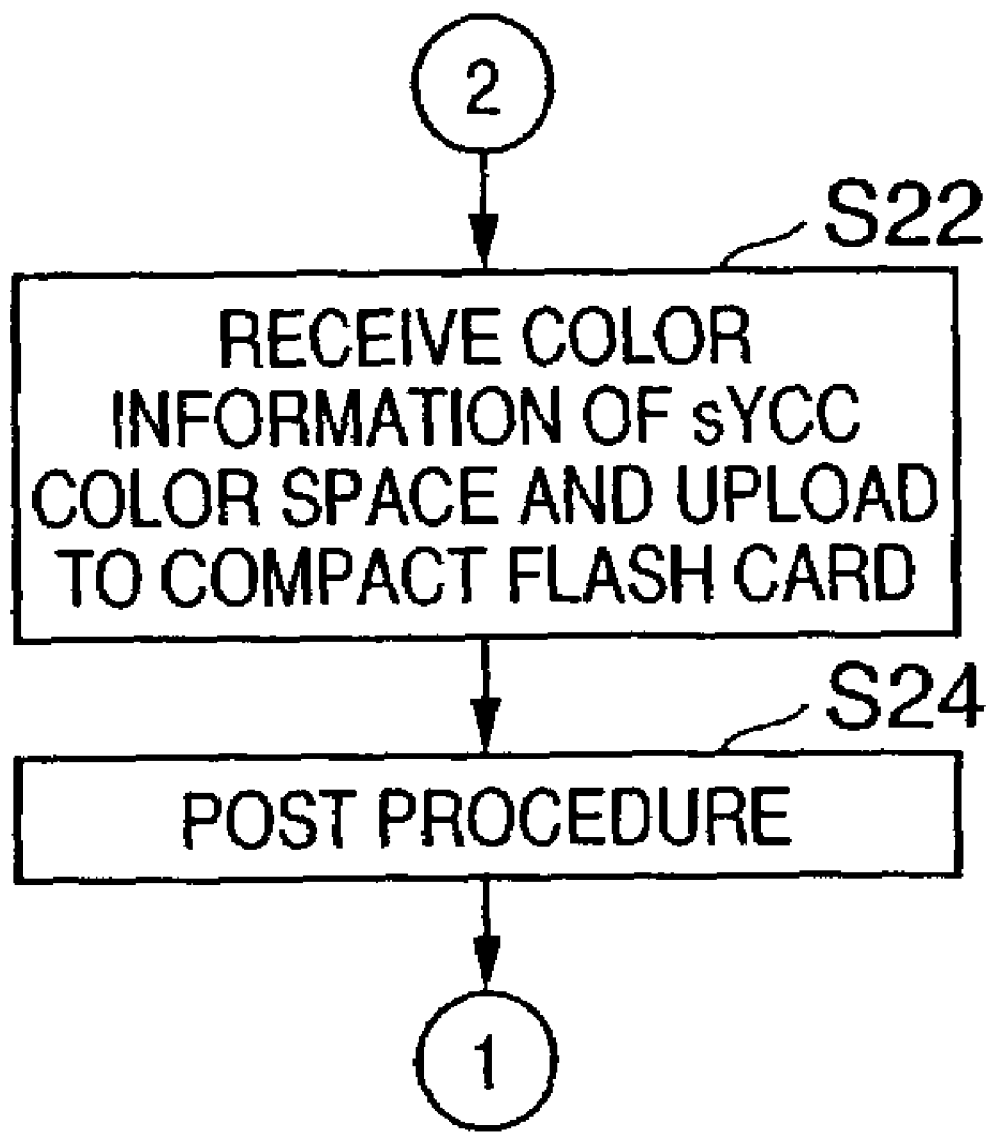
Figure 5:
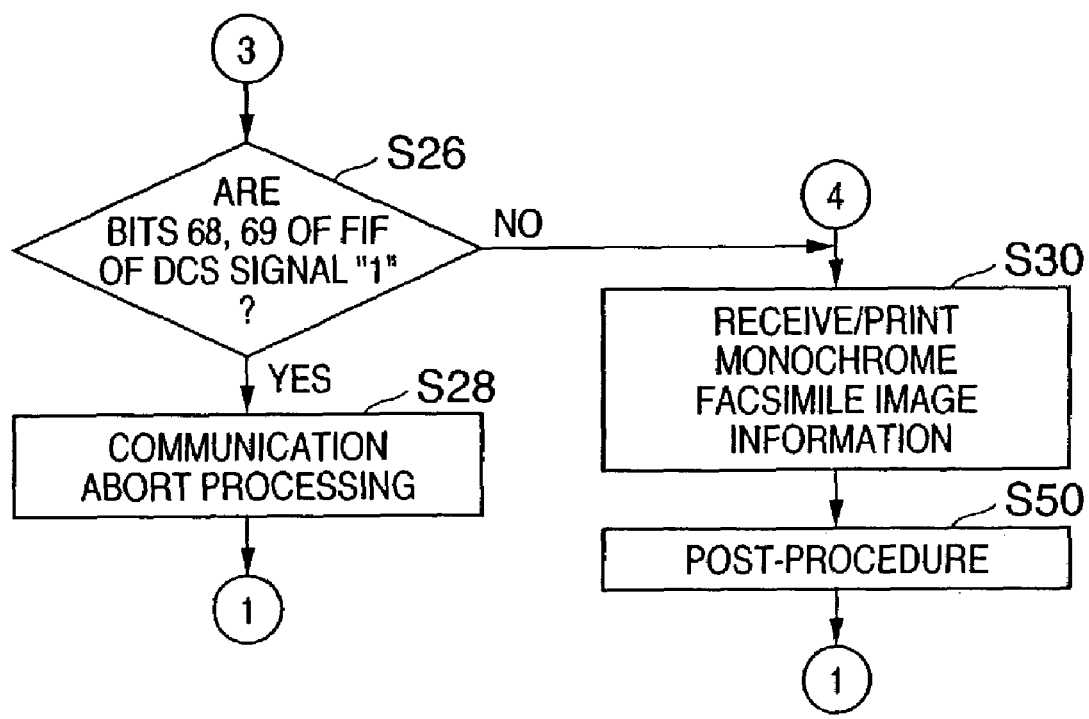

Reference will be had to the flowcharts of FIGS. 3 to 5 to describe a control procedure that is based upon the bits of the FIF of each signal (see FIG. 2) in the facsimile apparatus on the side of the receiver. It should be noted that there is a procedure for setting the bits of the FIF of each signal in FIG. 2 in a case where the facsimile apparatus is on the transmitter side, this procedure being a control procedure of the facsimile apparatus relating to another aspect of the present invention. However, since this procedure is a simple one, it is included in other processing (S10 in FIG. 3) and will not be described here. Further, other control procedures for facsimile transceiving that are known may be used and need not be described here.

In FIG. 3, step S0 represents the start of the procedure. The memory 18 is initialized via bus 26 at step S2 and the display unit of the control panel is cleared via the bus 26 at step S4. The CML of the NCU 2 is turned off via the bus 26 at step S6, whereby line 2*a* is connected to the telephone 4. It is determined at step S8 whether receive has been selected. If receive has been selected ("YES" at step S8), control proceeds to step S12; if receive has not been selected ("NO" at step S8), then control proceeds to step S10 and other processing is executed. This processing (S10) also includes a procedure for setting the bits of the FIF of each signal in FIG. 2. The CML of the NCU 2 is turned on via the bus 26 at step S12, whereby the line 2*a* is connected to the facsimile function (the side of hybrid circuit 6).

It is determined as step S14 whether the compact flash card 30 has been inserted into the card interface 28. If it has been inserted ("YES" at step S14), control proceeds to step S16; if it has not been inserted ("NO" at step S14), the control proceeds to step S18.

If the compact flash card 30 has been inserted, the preliminary procedure of step S16 is executed. Here bit 68 and bit X of the FIF of the DIS signal are made "1" (turned ON) and bit 69 is made "0" (turned OFF). This is followed by step S20, at which it is determined whether bit 68 and bit X of the FIF of the DCS signal are "1" (ON). If both bits are "1" ("YES" at step S20) control proceeds to step S22. If at least one is "0" ("NO" at step S20), control proceeds to step S26.

If bit 68 and bit X of the FIF of the DCS signal are both "1", i.e., if JPEG transmission has been specified and so has color transmission in sYCC color space, then color information in sYCC color space is received at step S22 and this information is uploaded to the card interface 28. This is followed by a post-procedure at step S24.

If at least one of bit 68 and bit X of the FIF of the DCS signal is "0", it is determined at step S26 whether bits 68 and 69 of the FIF of the DCS signal are "1" (ON). If both bits are "1" ("YES" at step S26), control proceeds to step S28. Since full-color information in Lab color space cannot be received, processing for suspending communication is executed at step S28. If at least one of the bits is "0" ("NO" at step S26), then control proceeds to step S30.

Step S30 is processing for receiving/printing monochrome facsimile image information. That is, in a case where JPEG transmission has been specified, or in a case where full-color information in Lab color space has been specified but full-color information in sYCC color space has not, monochrome reception is performed at step S30 and the information is output to the printer (printing circuit 16). This is followed by a post-procedure at step S50.

On the other hand, if it is determined at step S14 that the compact flash card 30 has not been inserted, control proceeds to the preliminary procedure of step S18. Here bits 68, 69 and bit X of the FIF of the DIS signal are all made "0" (turned OFF). Control then proceeds to step S30, at which monochrome facsimile image information is received/printed.

The above flowchart has been described by operation of a called station in an example of notification of the receiving function of the facsimile apparatus based upon the bits 68, 69 and bit X of the FIF of the DIS signal, i.e., in a "call transmit" procedure. However, notification of the receiving function based upon the FIF of the DTC signal also is similar except for the fact that the DTC signal is used instead of the DIS signal in the operation of the calling station in a "call receive" procedure.

<Example of Structure of Facsimile Apparatus According to the Second Embodiment>

The structure of the facsimile apparatus according to the second embodiment is similar to that of the first embodiment as shown in FIG. 1 excepting that printing circuit 16 is capable of printing color information in Lab space.

<Example of Operation of Facsimile Apparatus According to the Second Embodiment>

FIG. 6 illustrates another example of important bits and a protocol added to ITU-T Recommendation T.30 by the present invention.

Whether or not the apparatus has a JPEG receiving function is reported by the ON or OFF status of bit 68 of the FIF of a DIS signal and/or DTC signal, which is sent from the receiving side to the transmitting side, and JPEG transmission is designated by the ON or OFF status of bit 68 of the FIF of a DCS signal from the transmitting side to the receiving side. Further, whether or not the apparatus has a function for receiving full color in the Lab color space is reported by the ON or OFF status of bit 69 of the FIF of the DIS/DTC signal, and full-color transmission in Lab color space is designated by the ON or OFF status of bit 69 of the FIF of the DCS signal. Further, whether or not the apparatus has a JPEG receiving function for sYCC color space is reported by the ON or OFF status of bit Y of the FIF of the DIS/DTC signal, and JPEG transmission in sYCC color space is designated by the ON or OFF status of bit Y of the FIF of the DCS signal. That is, bit 68 of the FIF of the DIS signal/DTC signal/DCS signal is used in giving notification of the JPEG communication function, bit 69 of the FIF of the DIS signal/DTC signal/DCS signal is used in giving notification of the full-color communication function for Lab color space, and bit Y of the FIF of the DIS signal/DTC signal/DCS signal is used in giving notification of the JPEG communication function for sYCC color space.

Thus, a facsimile apparatus capable of communicating file information includes information receiving means having a function for receiving JPEG-coded information and a function for receiving information in sYCC color space; function notification means for reporting the receiving function of this apparatus to a transmitting side; a removable storage medium for storing information; information storage means for storing JPEG-coded information in sYCC color space, which has been received from the transmitting side, on the storage medium; and status detection means for detecting whether the storage medium has been installed or removed. If the status detection means has detected removal of the storage medium, the function notification means notifies the transmitting side of absence of the function for receiving information, which is JPEG-coded information, in sYCC color space.

If the storage medium has been inserted, the function notification means notifies the transmitting side of the fact that the apparatus has the function for receiving information, which is JPEG-coded information, in sYCC color space. Further, the JPEG-coded information in sYCC color space received from the transmitting side is not printed by the printer. The JPEG-coded information in sYCC color space received from the transmitting side is stored on the storage medium. The storage medium is a memory card.

A control program for the second example of operation described above is stored in the ROM 24 of the facsimile apparatus. The program is executed by CPU 22.

Figure 8:
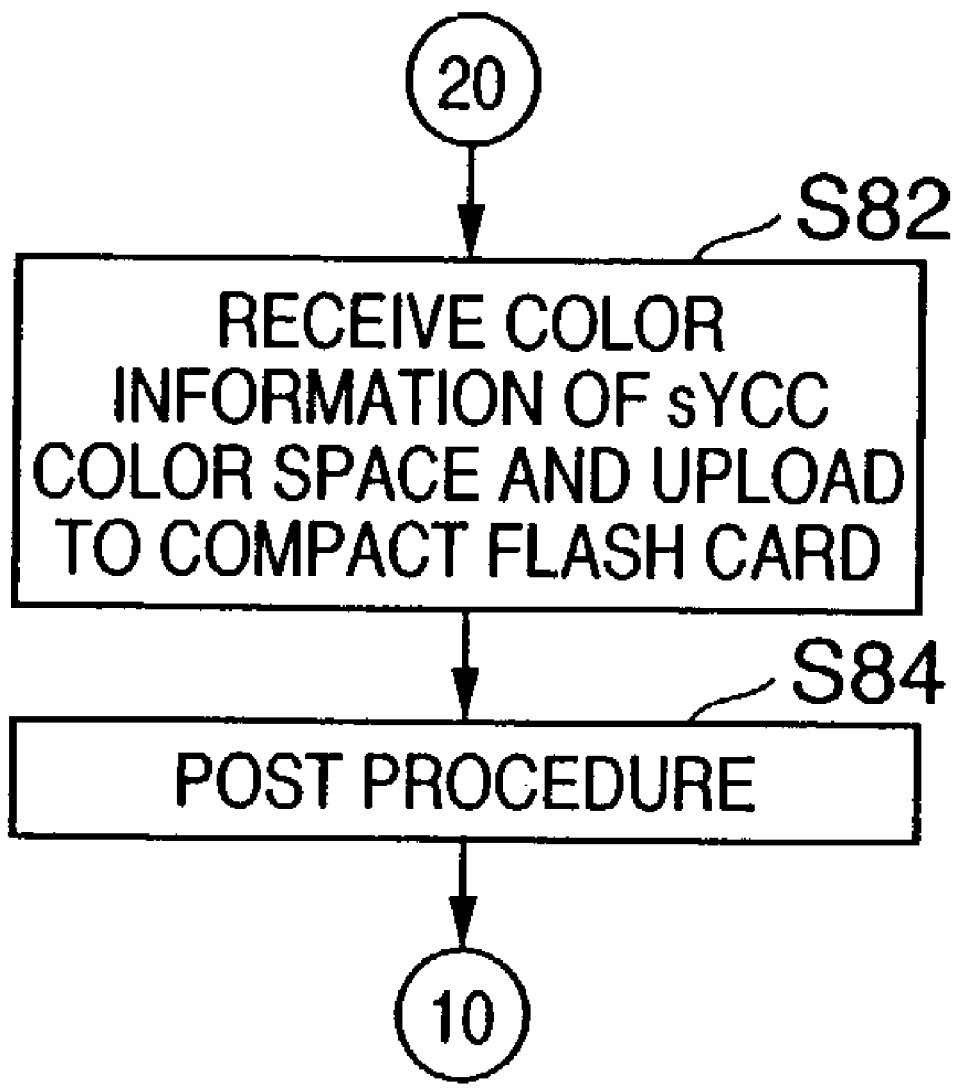
Figure 9:
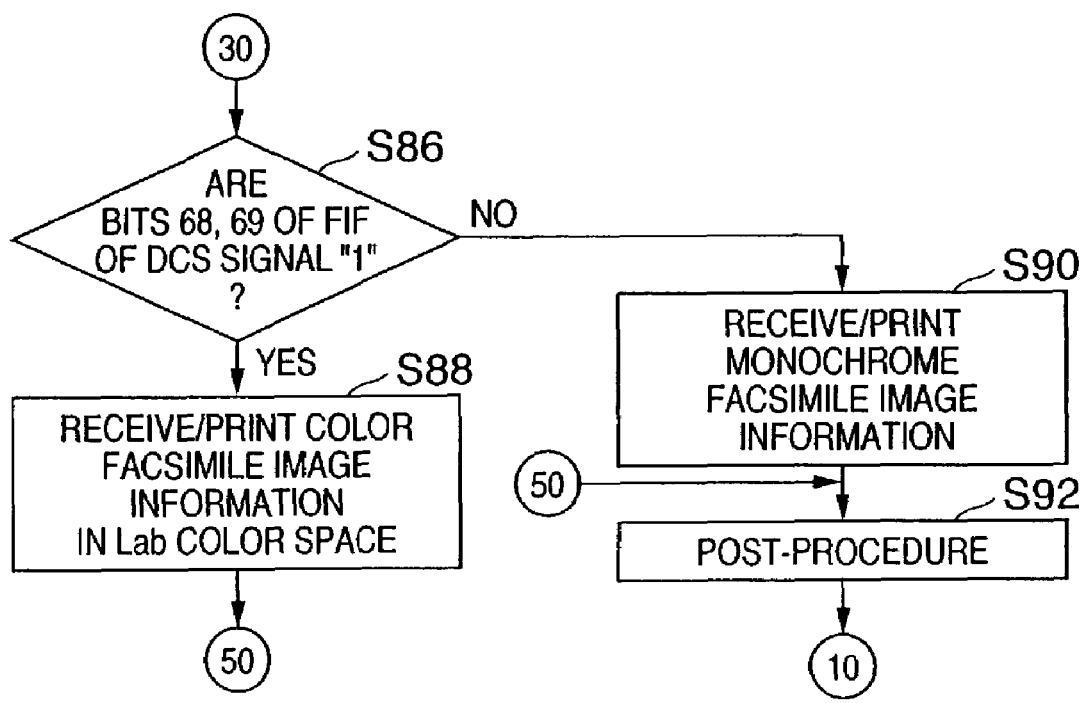

Reference will be had to the flowcharts of FIGS. 7 to 9 to describe a control procedure that is based upon the bits of the FIF of each signal (see FIG. 6) in the facsimile apparatus on the side of the receiver. It should be noted that there is a procedure for setting the bits of the FIF of each signal in FIG. 6 in a case where the facsimile apparatus is on the transmitter side, this procedure being a control procedure of the facsimile apparatus relating to another aspect of present invention. However, since this procedure is a simple one, it is included in other processing (S70 in FIG. 7) and will not be described here. Further, other control procedures for facsimile transceiving that are known may be used and need not be described here.

In FIG. 7, step S60 represents the start of the procedure. The memory 18 is initialized via bus 26 at step S62 and the display unit of the control panel is cleared via the bus 26 at step S64. The CML of the NCU 2 is turned off via the bus 26 at step S66, whereby line 2a is connected to the telephone 4. It is determined at step S68 whether receive has been selected. If receive has been selected ("YES" at step S68), control proceeds to step S62; if receive has not been selected ("NO" at step S68), then control proceeds to step S70 and other processing is executed. This processing (S70) also includes a procedure for setting the bits of the FIF of each signal in FIG. 6. The CML of the NCU 2 is turned on via the bus 26 at step S72, whereby the line 2a is connected to the facsimile function (the side of hybrid circuit 6).

It is determined as step S74 whether the compact flash card 30 has been inserted into the card interface 28. If it has been inserted ("YES" at step S74), control proceeds to step S76; if it has not been inserted ("NO" at step S74), control proceeds to step S78.

If the compact flash card 30 has been inserted, the preliminary procedure of step S76 is executed. Here bits 68, 69 and bit Y of the FIF of the DIS signal are made "1" (turned ON). This is followed by step S80, at which it is determined whether bit Y of the FIF of the DCS signal is "1" (ON). If this bit is "1" ("YES" at step S80), control proceeds to step S82; if the bit is "0" ("NO" at step S80), control proceeds to step S86.

If bit Y of the FIF of the DCS signal is "1", i.e., if JPEG transmission and color transmission in sYCC color space have been designated, then color information in sYCC color space is received at step S82 and this information is uploaded to the card interface 28. This is followed by a post-procedure at step S84.

If bit Y of the FIF of the DCS signal is "1", it is determined at step S86 whether bits 68 and 69 of the FIF of the DCS signal are "1" (ON). If both bits are "1" ("YES" at step S86), control proceeds to step S88. Here processing for receiving color information in Lab color space and color printing the received color information using the printing circuit 16 is executed. If at least one of the bits is "0" ("NO" at step S86), then control proceeds to step S90.

Step S90 is processing for receiving/printing monochrome facsimile image information. That is, in a case where JPEG transmission has been designated, or in a case where JPEG full-color information in Lab color space has been designated but JPEG information in sYCC color space has not, monochrome reception is performed at step S90 and the information is output to the printer (printing circuit 16). This is followed by a post-procedure at step S92.

On the other hand, if it is determined at step S74 that the compact flash card 30 has not been inserted, control proceeds to the preliminary procedure of step S78. Here bits 68 and 69 of the FIF of the DIS signal are all made "1" (turned ON) and bit Y is made "0" (turned OFF).

The above flowchart has been described by operation of a called station in an example of notification of the receiving function of the facsimile apparatus based upon bits 68, 69 and bit Y of the FIF of the DIS signal, i.e., in a "call transmit" procedure. However, notification of the receiving function based upon the FIF of the DTC signal also is similar except for the fact that the DTC signal is used instead of the DIS signal in the operation of the calling station in a "call receive" procedure.

Further, it is described above that bit X is used in the first example of operation and bit Y in the second example of operation. However, this does not impose a limitation upon the present invention. For example, it is permissible to adopt other methods (settings of signals and bits or another control flow) in which control is exercised in such a manner that communication of color image data in SYCC color space is implemented by a monochrome facsimile apparatus using the bits of the FIF of the DIS signal, and these methods also are covered by the present invention.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiment, and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment. In a case where the present invention is applied to the storage medium, program code corresponding to the flowcharts described earlier would be stored on the storage medium.

According to the present invention, a monochrome facsimile apparatus supports only sYCC color space, received information in sYCC color space is uploaded to a card (e.g., a compact flash card), and the received information that has been stored on the card can be displayed on a personal computer or viewed by a digital camera. If the compact flash card has not been inserted, uploading of color file information in sYCC color space to the card is impossible even if this information is received. This makes it possible to forego receiving color file information and, hence, eliminates reception of color file information that is essentially useless. The facsimile apparatus is a monochrome apparatus, it is possible to communicate color file information in sYCC color space by an inexpensive apparatus, and this information can be uploaded to a card. Such an apparatus is very easy for a user to operate.

Further, according to the present invention, the facsimile apparatus is a color facsimile apparatus, and color file information in sYCC color space can be uploaded to a card and color file information in Lab color space can be printed by a printing unit.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus capable of communicating file information, said facsimile apparatus capable of receiving JPEG-coded information and color information in sYCC color space, comprising:
   function notification means for notifying a transmitting side of a receiving function of this facsimile apparatus;
   storage medium setting unit for setting a storage medium for storing information;
   information storing means for storing JPEG-coded information in sYCC color space, which is received from a transmitting side, into said storage medium; and status detection means for detecting whether said storage medium is installed or removed;
   wherein when said status detection means is detected removal of said storage medium, said function notification means notifies the transmitting side that this facsimile apparatus does not have a function for receiving JPEG-coded color information in sYCC color space, while when said storage medium is installed, said function notification means notifies the transmitting side that this facsimile apparatus has a function for receiving JPEG-coded color information in sYCC color space.

2. The apparatus according to claim 1, wherein JPEG-coded color information in sYCC color space received from the transmitting side is not printed by a printing unit, but stored into said storage medium.

3. The apparatus according to claim 1, wherein said apparatus is capable of receiving JPEG-coded color information in Lab color space, and JPEG-coded color information in Lab color space received from the transmitting side is printed by the printing unit.

4. A facsimile apparatus capable of communicating file information, said facsimile apparatus capable of receiving JPEG-coded information and color information in sYCC color space, comprising:
   storage medium setting unit for setting a storage medium for storing information;
   function notification means for notifying a transmitting side that this facsimile apparatus has a function for receiving JPEG-coded information, lacks a function for receiving color information in Lab color space, and has a function for receiving color information in sYCC color space;
   receive control means for controlling to receive color information when a designation to transmit color information in sYCC color space is received from the transmitting side, color information storing means for storing JPEG-coded color information in sYCC color space, which is received from the transmitting side, into said storage medium.

5. The apparatus according to claim 4, further comprising: status detection means for detecting whether said storage medium is installed or removed;
   wherein when said storage medium is not installed, said function notification means notifies the transmitting side that this facsimile apparatus does not have the function for receiving JPEG-coded information, the function for receiving color information in Lab color space, or the function for receiving color information in sYCC color space.

6. The apparatus according to claim 4, further comprising receive abort means for aborting receive when a transmit designation for JPEG-coded color information in Lab color space is received from the transmitting side.

7. The apparatus according to claim 4, further comprising a monochrome printing unit, wherein JPEG-coded color information in sYCC color space received from the transmitting side is not printed by said printing unit.

8. The apparatus according to claim 4, further comprising:
information transmitting means capable of transmitting JPEG-coded information and color information in sYCC color space;
function notification receiving means for receiving, from a receiving side, notification as to whether the receiving side has the function for receiving JPEG-coded information, has the function for receiving color information in Lab color space, and has the function for receiving color information in sYCC color space; and
transmit control means for causing said information transmitting means to transmit color information in sYCC color space and a transmit designation, when notification that the receiving side has the function for receiving JPEG-coded information and the function for receiving color information in sYCC color space is received from the receiving side.

9. The apparatus according to claim 1, wherein notification of function is performed by prescribed bits of a FIF of a DIS and/or DTC signal, and said transmit designation is implemented by prescribed bits of a FIF of a DCS signal.

10. The apparatus according to claim 4, wherein notification of function is performed by prescribed bits of a FIF of a DIS and/or DTC signal, and said transmit designation is implemented by prescribed bits of a FIF of a DCS signal.

11. A method of controlling a facsimile apparatus capable of communicating file information, said facsimile apparatus capable of receiving JPEG-coded information and color information in sYCC color space, and having a storage medium setting unit for setting storage medium for storing JPEG-coded color information in sYCC color space received from a transmitting side, said method comprising the steps of:
detecting whether said storage medium is installed or removed; and
notifying the transmitting side that this facsimile apparatus does not have a function for receiving JPEG-coded color information in sYCC color space, when said storage medium is not installed, while notifying the transmitting side that said facsimile apparatus has a function for receiving JPEG-coded color information in sYCC color space, when said storage medium is installed.

12. The method according to claim 11, wherein JPEG-coded color information in sYCC color space received from the transmitting side is not printed by a printing unit, but stored into said storage medium.

13. The method according to claim 11, wherein said apparatus is capable of receiving JPEG-coded color information in Lab color space, and JPEG-coded color information in Lab color space received from the transmitting side is printed by the printing unit.

14. A method of controlling a facsimile apparatus capable of communication color file information, said facsimile apparatus capable of receiving JPEG-coded information and color information in sYCC color space, and having a storage medium setting unit for setting storage medium for storing JPEG-coded color information in sYCC color space received from s transmitting side, said method comprising the steps of:

notifying a transmitting side that this facsimile apparatus has a function for receiving JPEG-coded information, lacks a function for receiving color information in Lab color space, and has a function for receiving color information in sYCC color space;
controlling to receive color information when a designation to transmit color information in sYCC color space is received from the transmitting side; and
storing JPEG-coded color information in sYCC color space received from the transmitting side into said storage medium.

15. The method according to claim 14, further comprising a step of detecting whether said storage medium is installed or removed;
wherein when said storage medium is not installed, said function notification step notifies the transmitting side that this facsimile apparatus lacks the function for receiving JPEG-coded information, the function for receiving color information in Lab color space, and the function for receiving color information in sYCC color space.

16. The method according to claim 14, further comprising a step of aborting receive when a transmit designation for JPEG-coded color information in Lab color space is received from the transmitting side.

17. The method according to claim 14, wherein said facsimile apparatus further includes a monochrome printing unit, and JPEG-coded color information in sYCC color space received from the transmitting side is not printed by said printing unit.

18. The method according to claim 11, wherein notification of function is performed by prescribed bits of a FIF of a DIS and/or DTC signal, and transmit designation is implemented by prescribed bits of a FIF of a DCS signal.

19. The method according to claim 14, wherein notification of function is performed by prescribed bits of a FIF of a DIS and/or DTC signal, and transmit designation is implemented by prescribed bits of a FIF of a DCS signal.

20. A computer program embedded on a readable medium for implementing the method of controlling the facsimile apparatus set forth in any one of claims 11 to 19.

21. A computer readable medium storing the computer program set forth in claim 20.

22. A color information communication system in which a plurality of facsimile apparatuses capable of communicating color file information are connected, wherein a facsimile apparatus on a receiving side capable of receiving JPEG-coded information and color information in sYCC color space, comprises:
storage medium setting unit for setting a storage medium for storing information;
information storing means for storing JPEG-coded information in sYCC color space, which is received from a transmitting side, into said storage medium;
status detection means for detecting whether said storage medium is installed or removed;
function notification means for notifying a transmitting side that this facsimile apparatus does not have a function for receiving JPEG-coded color information in sYCC color space when said status detection means is detected removal of said storage medium, while that this facsimile apparatus has a function for receiving JPEG-coded color information in sYCC color space when said storage medium is installed; and
receive control means for controlling to receive color information when a designation to transmit JPEG-coded color information in sYCC color space is received from the transmitting side, and to store the received color information into said storage medium but not to print the received color information by a printing unit, and a facsimile apparatus on the transmitting side capable of transmitting JPEG-coded information and color information in sYCC color space, comprises:

function notification receiving means for receiving, from the receiving side, notification as to whether the receiving side has the function for receiving JPEG-coded color information in SYCC color space; and transmit control means for controlling to transmit color information in sYCC color space and a transmit designation to the receive side when notification that the receiving side has the function for receiving JPEG-coded color information in sYCC color space is received from the receiving side.

23. The system according to claim 22, wherein said facsimile apparatuses on the receive and transmit sides are capable of receiving and/or transmitting JPEG-coded color information in Lab color space, and JPEG-coded color information in Lab color space received from the transmitting side is printed by the printing unit on the receive side.

24. A color information communication method capable of communicating color file information, comprising the steps of:

an apparatus on a receiving side capable of receiving JPEG-coded information and color information in sYCC space notifying an apparatus on a transmitting side that the apparatus on the receiving side has a function for receiving JPEG-coded color information in sYCC color space, when a storage medium is installed in a storage medium setting unit of the apparatus on the receiving side;

the apparatus on the receive side transmitting JPEG-coded color information in sYCC color space and a transmit designation to the apparatus on the receiving side when receiving said notification of the receiving function; and the apparatus on the receiving side recognizing the received transmit designation, receiving the JPEG-coded color information in sYCC color space transmitted from the apparatus on the transmitting side, and storing the received color information into said storage medium but not printing the received color information by a printing unit on the receive side.

25. The method according to claim 24, wherein said apparatuses on the receive and transmit sides are capable of receiving and/or transmitting JPEG-coded color information in Lab color space, and JPEG-coded color information in Lab color space received from the transmitting side is printed by the printing unit on the receive side.

* * * * *

UNITED STATES PATENT AND TRADEMARK OFFICE
CERTIFICATE OF CORRECTION

PATENT NO. : 7,239,419 B2  Page 1 of 1
APPLICATION NO. : 10/376087
DATED : July 3, 2007
INVENTOR(S) : Takehiro Yoshida It is certified that error appears in the above-identified patent and that said Letters Patent is hereby corrected as shown below:

Column 11, Line 66, change "S" to --a--.

Signed and Sealed this

Twenty-seventh Day of November, 2007

JON W. DUDAS
*Director of the United States Patent and Trademark Office*